United States Patent [19]
Petrinec

[11] 3,908,976
[45] Sept. 30, 1975

[54] WING SUPPORT FOR MODEL AIRCRAFT

[76] Inventor: Robert G. Petrinec, 617 S. East Ave., Oak Park, Ill. 60304

[22] Filed: Apr. 10, 1974

[21] Appl. No.: 459,609

[52] U.S. Cl............. 269/40; 46/244 B; 269/321 W
[51] Int. Cl.²................... A63H 27/02; B25B 11/02
[58] Field of Search.......... 217/61; 29/200 P, 200 J; 269/321 W, 37, 40, 41; 46/78, 243, 244; 33/180 R

[56] References Cited
UNITED STATES PATENTS

| | | | |
|---|---|---|---|
| 922,611 | 5/1909 | Morrow | 217/61 |
| 1,336,426 | 4/1920 | Fredericksen | 33/194 |
| 2,996,325 | 8/1961 | Chenel | 217/61 |

*Primary Examiner*—Roy Lake
*Assistant Examiner*—Neil Abrams

[57] ABSTRACT

A wing support for model aircraft for holding the wing of a multichannel radio-controlled model relative to the wing saddle of the fuselage so that connection and adjustment of interrelated components between the wing and fuselage can be made while the wing is firmly supported in a vertical position over the wing saddle.

6 Claims, 6 Drawing Figures

U.S. Patent  Sept. 30, 1975  3,908,976
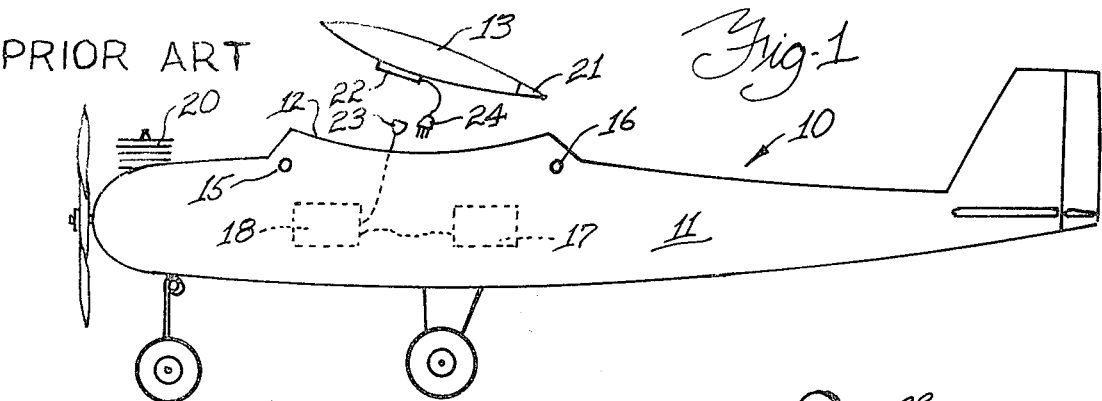
PRIOR ART  Fig-1
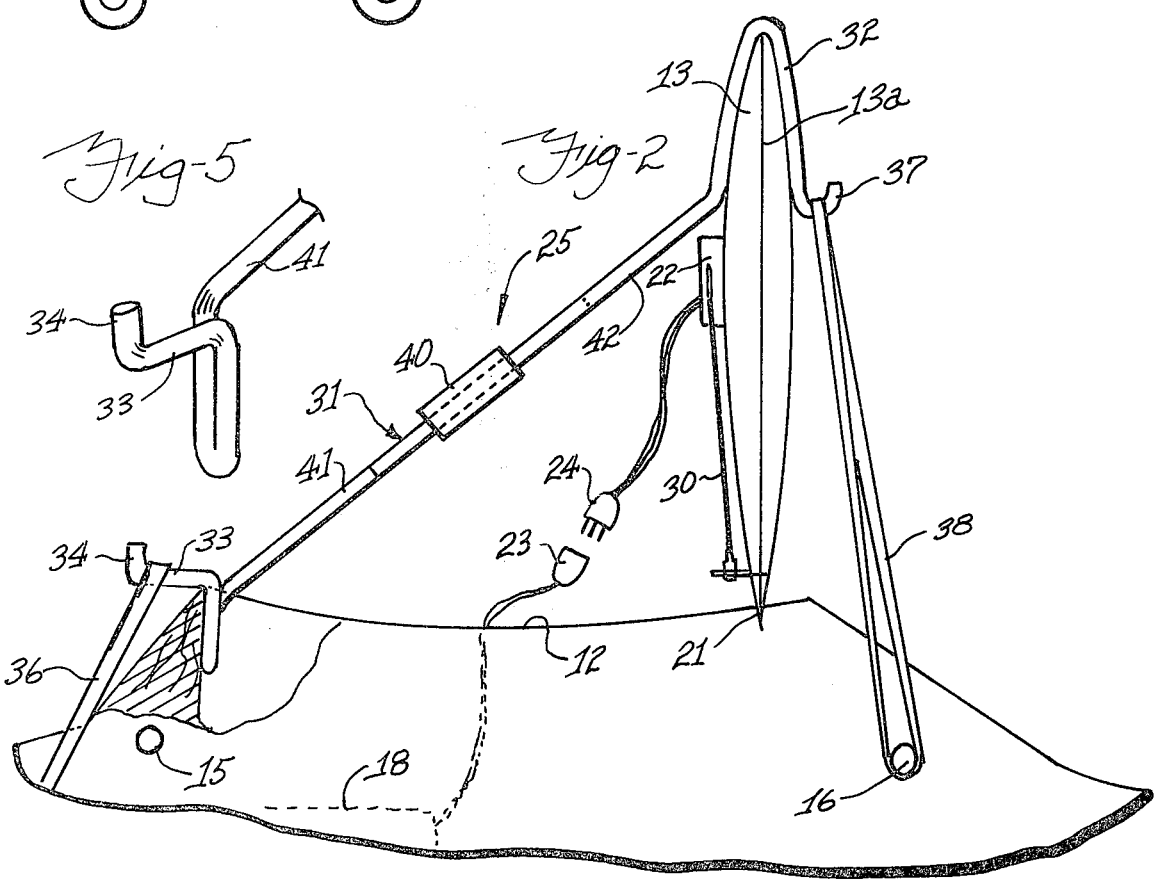
Fig-5  Fig-2
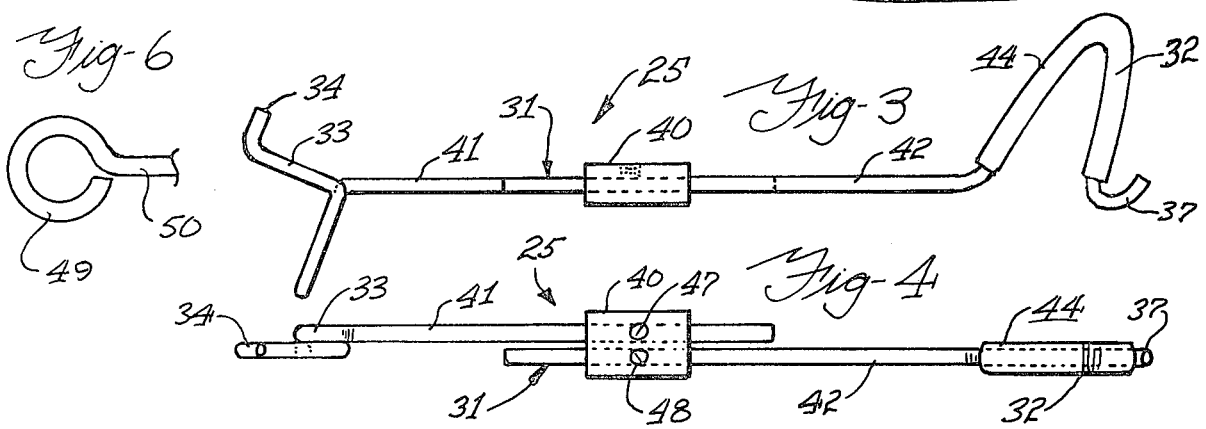
Fig-6  Fig-3  Fig-4

WING SUPPORT FOR MODEL AIRCRAFT

BAKCGROUND OF THE INVENTION

This invention relates generally to a model aircraft wing support, and more particularly to a wing support adapted for use for radio-controlled models to facilitate interconnection of aileron servo wires and linkages and the like.

Radio-controlled model aircraft of the multichannel type generally have servo motors installed in the aircraft fuselage to operate the elevator and rudder control surfaces and to control a throttle device on the model engine. Also associated with the multichannel radio-controlled equipment is an aileron servo generally mounted in the center of the wing but which is to be connected to a radio receiver positioned within the fuselage. Therefore, when connecting the wing to the fuselage, electrical and sometimes mechanical connections must be made. Generally it requires the use of two people, one to hold the wing and the other to make the connections.

SUMMARY OF THE INVENTION

Accordingly, it is an object of this invention to provide a wing support bracket which will hold the wing in position over the fuselage to enable a single person to make all the necessary interconnections between the aileron servo and linkages and the radio receiver within the fuselage.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a side view of a model aircraft showing the wing in position over the wing saddle for connecting interrelated radio components;

FIG. 2 is an enlarged fragmentary side view of a model aircraft having the wing supported by a bracket constructed in accordance with the principles of this invention;

FIG. 3 is a side view of the wing support bracket of this invention;

FIG. 4 is a top view of the wing support bracket of this invention;

FIG. 5 is a perspective view of the fuselage-engaging end of the bracket of this invention; and FIG. 6 is an alternate fuselage-engaging configuration in accordance with this invention.

DETAILED DESCRIPTION OF THE ILLUSTRATED EMBODIMENT

FIG. 1 shows a model aircraft 10 comprising a fuselage 11 constructed in a standartd manner having a wing saddle 12 to which a wing structure 13 is secured. In the illustrated embodiment the wing 13 is held in position on the wing saddle 12 by a plurality of large rubber bands connected between spaced apart dowel rods 15 and 16. Positioned within the fuselage 11 are a plurality of servo motors designated by the phantom lines 17 and a radio receiver 18. The servo motors 17 are interconnected with the radio 18 so that signals received from a transmitter, in a well-known manner, will control movement of the elevator and rudder control surfaces as well as throttle linkages to a motor 20. In a multichannel aircraft the wing 13 has ailerons 21 to be controlled by a servo motor 22 positioned within the center portion of the wing 13. However, the servo motor 22 must also be interconnected with the radio receiver 18, this being accomplished by connector plugs 23 and 24. Heretofore, when making this connection the wing 13 must be held over the wing saddle 12 by a second person or merely laid over the wing saddle and the connection made while the wing is resting on the back of the operator's hands. In either case the connection is somewhat a cumbersome operation. Furthermore, the adjustment of linkages between the servo 22 and aileron 21 is not easily facilitated.

In accordance with this invention a wing support bracket 25 is provided to hold the wing 13 in a substantially vertical position over the wing saddle 12. The wing chord 13a, which is a line extending through the wing from the leading edge to the trailing edge, is maintained at an angle of approximately 90°, it being variable from between 30° to 90°, so that the open area of the fuselage defined by the wing saddle is readily accessible to the user's hands so that the connecting plugs 23 and 24 can be fastened together. Also with the wing in this position, servo linkages 30 can be adjusted and operated while the plugs 23 and 24 are connected.

The wing support bracket 25 includes an elongated member 31 having a wing-edge-engaging bight portion 32 formed at one end and a fuselage-engaging portion 33 formed at the other end. The fuselage-engaging portion 33 is substantially a right angle bend in the wire forming the support bracket and terminates at a hook portion 34 so that an elastic element such as a rubber band 36 can be fastened thereto. A hook 37 is formed at the terminating end of the wing-engaging bight portion 32 also to receive a rubber band 38. The bight portion 32 is sufficiently large so as to engage a substantial portion of the wing edge, either the leading edge or the trailing edge.

The wing support bracket 25 has an adjustable coupling 40 to receive wire members 41 and 42 of the elongated member 31. The coupling 40 enables the elongated member to be adjusted thereby adapting the support bracket to different size wings and fuselages.

FIGS. 3, 4 and 5 illustrate the details of construction of the wing bracket. FIG. 3 further illustrates a resilient sleeve member 44 positioned over the bight portion 32. This is an optional element and is used to cushion engagement with the wing surface. A similar resilient sleeve portion may be positioned at the fuselage-engaging portion. The coupling 40 has setscrews 47 and 48 to lock the rod portions in a fixed position. FIG. 5 illustrates the bend of the wire to obtain a suitable fuselage-engaging end portion.

FIG. 6 illustrates an alternate fuselage-engaging portion. Here a circular opening 49 is formed at the end of a wire rod 50 so as to be placed upon the forward wing hold-down rod 15, FIGS. 1 and 2. The eyelet or opening 49 is placed upon the dowel rod 15 and the entire fuselage-engaging portion held in place by one or two rubber bands extending from side to side across the hold-down dowel rod 15.

The invention is claimed as follows:

1. A wing support for model aircraft comprising: an elongated member, a wing-edge-engaging bight portion formed at one end of said elongated member, a fuselage-engaging portion formed at the other end of said elongated member, and holding means formed at each end for temporarily firmly connecting the wing support to a wing and fuselage of a model aircraft so that the wing is held in a position with the chord thereof at an angle of between 30° and 90° relative to a wing saddle formed on the fuselage, whereby connection and adjustment of interrelated components between the wing and the fuselage can be made while the wing is supported on the fuselage.

2. The wing support for model aircraft as set forth in claim 1 wherein said holdng means is a hook formed at the wing-edge-engaging bight portion and a hook formed at the fuselage-engaging portion, whereby resilient elastic elements can be connected to said hooks and about the fuselage to hold the wing support bracket firmly in place.

3. The wing support for model aircraft as set forth in claim 1 further including adjusting means positioned along said elongated member to adjust the length thereof and thereby change the distance between the wing-edge-engaging bight portion and the fuselage-engaging portion.

4. The wing support for model aircraft as set forth in claim 3 wherein said elongated member is formed of two discrete lengths of rod material, said lengths being maintained in substantially parallel side-by-side arrangement, and said adjusting means is formed of a collar having a pair of spaced apart apertures slidably to receive said discrete lengths of rod material.

5. The wing support for model aircraft as set forth in claim 4 wherein said collar includes locking means for locking said discrete lengths together to prevent inadvertent relative movement therebetween.

6. The wing support for model aircraft as set forth in claim 1 further including a resilient sleeve over said wing-edge-engaging bight portion.

* * * * *